United States Patent
Hasan

(10) Patent No.: US 10,377,208 B2
(45) Date of Patent: Aug. 13, 2019

(54) USE OF DISCHARGE AIR SENSORS TO CONTROL RECIRCULATION DOOR DURING HEAT REQUEST

(71) Applicant: Ford Global Technologies, LLC, Dearborn, MI (US)

(72) Inventor: Jamal Hasan, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/668,325

(22) Filed: Aug. 3, 2017

(65) Prior Publication Data

US 2019/0039435 A1 Feb. 7, 2019

(51) Int. Cl.
*B60H 1/00* (2006.01)
(52) U.S. Cl.
CPC ..... *B60H 1/00849* (2013.01); *B60H 1/00764* (2013.01); *B60H 1/00785* (2013.01); *B60H 1/00792* (2013.01); *B60H 1/00807* (2013.01); *B60H 1/00842* (2013.01)
(58) Field of Classification Search
CPC ............ B60H 1/00785; B60H 1/00764; B60H 1/00792; B60H 1/00807; B60H 1/00842; B60H 1/00849
See application file for complete search history.

(56) References Cited

U.S. PATENT DOCUMENTS

| | | | |
|---|---|---|---|
| 4,829,884 A * | 5/1989 | Kagohata | B60H 1/00842 165/265 |
| 6,168,515 B1 * | 1/2001 | Daimon | B60H 1/008 165/249 |
| 6,209,331 B1 | 4/2001 | Lake et al. | |
| 6,454,178 B1 | 9/2002 | Fusco et al. | |
| 8,096,482 B2 | 1/2012 | Dage | |
| 9,434,235 B2 * | 9/2016 | Eisenhour | B60H 1/00742 |
| 2002/0115405 A1 | 8/2002 | Kemle et al. | |
| 2006/0086495 A1 * | 4/2006 | Yelles | B60H 1/00849 165/271 |
| 2007/0218824 A1 | 9/2007 | Bailey | |
| 2008/0066477 A1 | 3/2008 | Aoki et al. | |
| 2008/0115517 A1 | 5/2008 | Tacey et al. | |
| 2012/0009859 A1 | 1/2012 | Wijaya et al. | |
| 2014/0083672 A1 | 3/2014 | Rollinson et al. | |
| 2014/0308073 A1 * | 10/2014 | Delius | E01C 19/288 404/72 |
| 2017/0096048 A1 * | 4/2017 | Larson | B60H 1/3207 |

* cited by examiner

*Primary Examiner* — Jonathan Bradford
(74) *Attorney, Agent, or Firm* — Vichit Chea; Price Heneveld LLP

(57) ABSTRACT

A heating system for a passenger compartment of a motor vehicle includes a blower motor, one or more vents, a heater core, and a controller in communication with a humidity sensor, a vehicle speed sensor, an ambient temperature sensor, and a discharge air sensor. The controller is configured to open and close a recirculation air door as initiated by the humidity, vehicle speed, ambient temperature, and discharge air sensors.

15 Claims, 6 Drawing Sheets

USE OF DISCHARGE AIR SENSORS TO CONTROL RECIRCULATION DOOR DURING HEAT REQUEST

FIELD OF THE INVENTION

The present invention generally relates to an automotive HVAC system for controlling the heating of an automotive passenger compartment, and more particularly, to a multi-sensor system used to control the recirculation door on an automotive HVAC system.

BACKGROUND OF THE INVENTION

Automotive heating, ventilation, and air conditioning (HVAC) systems as traditionally designed have been unable to quickly heat the vehicle in an environment of extreme cold. Automobile users typically require the rapid heating of the passenger compartment in a vehicle to avoid dangerous conditions when driving in extreme temperatures. Passengers expect to achieve a level of comfort in as short a time period as possible.

Accordingly, there is a need to develop improved systems that have the ability to heat the passenger compartment of a vehicle more rapidly and more efficiently than the currently available options in the market.

SUMMARY OF THE INVENTION

According to one aspect of the present invention, a heating system for a passenger compartment of a motor vehicle is provided. The heating system includes a blower motor, one or more vent ducts, and a heater core. The heating system further includes a controller in communication with a humidity sensor, a vehicle speed sensor, an ambient temperature sensor, and a discharge air sensor. The controller is configured to open and close a recirculation door as initiated by the humidity, vehicle speed, ambient temperature, and discharge air sensors.

Embodiments of the first aspect of the invention can include any one or a combination of the following features:
  the ambient temperature sensor is coupled to the one or more vent ducts;
  the controller is electrically coupled to the humidity sensor, the vehicle speed sensor, the ambient temperature sensor, and the discharge air sensor;
  the recirculation door is opened to recirculate an air flow into the passenger compartment;
  the recirculation door is closed to circulate a fresh air flow into the passenger compartment;
  the humidity sensor is a relative humidity sensor;
  the controller is in communication with the heater core and the blower motor;
  the discharge air sensor is a real-time sensor;
  the passenger compartment has a plurality of heating zones; and
  the passenger compartment has a plurality of heating zones with each heating zone having one or more discharge air sensors positioned in the heating zone.

According to another aspect of the present invention, a method of providing heated air to a passenger compartment of a motor vehicle is provided. The method includes circulating a fresh air flow through a recirculation door. The method further includes monitoring a vehicle speed value, an internal humidity value, an external temperature value, and a discharge air temperature value using a vehicle speed sensor, a humidity sensor, an ambient temperature sensor, and a discharge air sensor. The method also includes switching the fresh air flow to a recirculated air flow when each of the vehicle speed, internal humidity, external temperature, and discharge air temperature values reach a threshold value.

Embodiments of the second aspect of the invention can include any one or a combination of the following features:
  detecting when the vehicle speed value is above 40 mph;
  detecting when the relative humidity value is above 50%;
  detecting when the external temperature value is below 3° C.; and
  detecting when the discharge air temperature value is above 70° C.

According to yet another aspect of the present invention, a heating system for a passenger compartment of a motor vehicle is provided. The heating system includes a controller coupled to a humidity sensor, an ambient temperature sensor, and a discharge air sensor. The controller is configured to open and close a recirculation door as initiated by the humidity, vehicle speed, ambient temperature, and discharge air sensors.

Embodiments of the third aspect of the invention can include any one or a combination of the following features:
  a vehicle speed sensor;
  the recirculation door is closed to recirculate an air flow into the passenger compartment;
  the recirculation door is opened to circulate a fresh air flow into the passenger compartment; and
  the discharge air sensor is coupled to one or more ducts.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
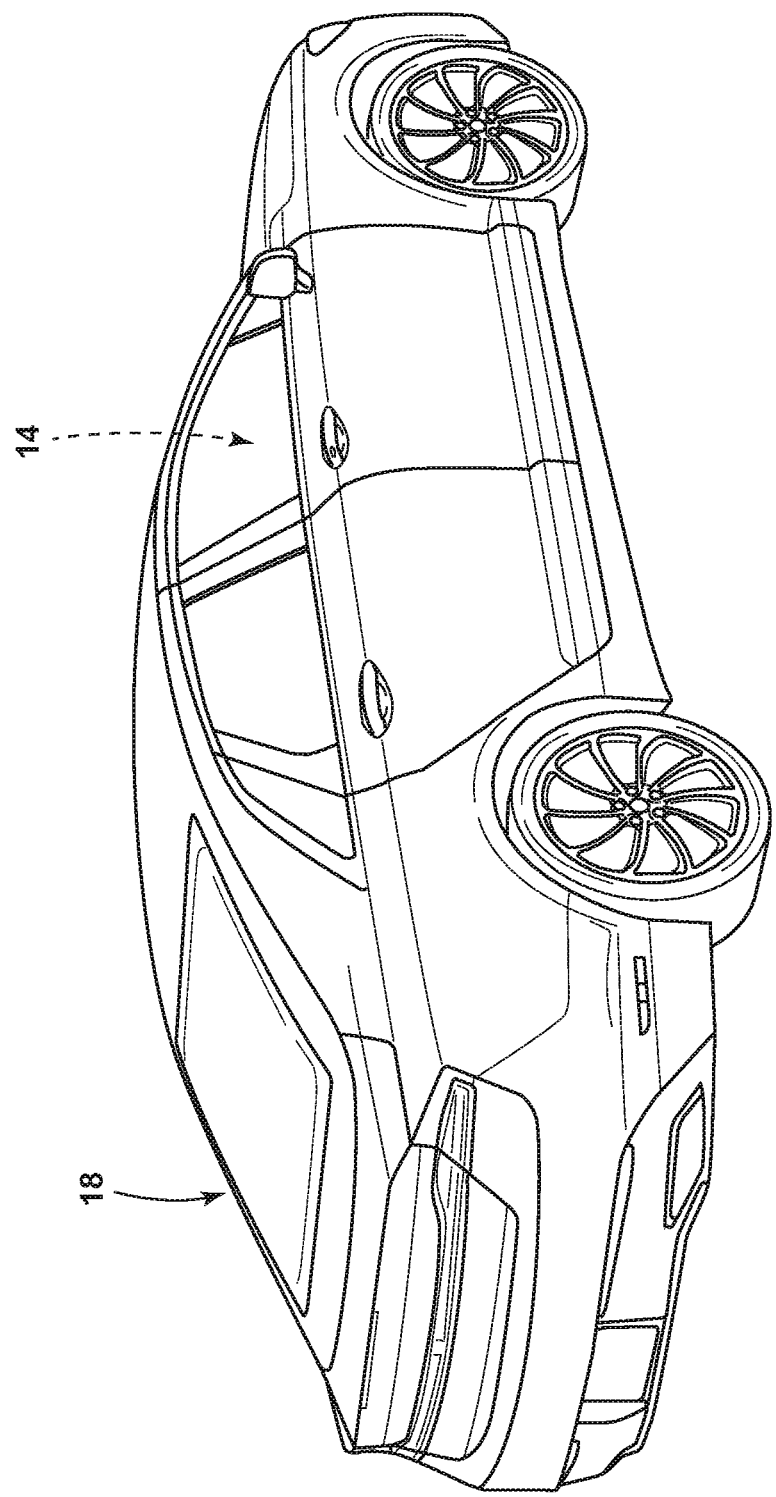
FIG. 1 is an isometric back side perspective view of a vehicle engaged with an HVAC system according to one aspect of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-5, reference numeral 10 generally designates a heating system for a passenger compartment 14 of a motor vehicle 18. The heating system 10 includes a blower motor 22, one or more vents 26, a heater core 30, and a controller 34 in communication with a humidity sensor 38, a vehicle speed sensor 42, an ambient temperature sensor 46, and a discharge air sensor 50. The controller 34 is configured to open and close a recirculation door 54 as initiated by the humidity, vehicle speed, ambient temperature, and discharge air sensors 38, 42, 46, 50. In some aspects, the heating system 10, as used herein, is understood to be a component or portion of a heating, ventilation, and air conditioning (HVAC) system 58. Depending on the application, the disclosed heating system 10 herein may be a standalone heating system or may be incorporated with other known HVAC 58 components including, for example, an air conditioning system, a ventilation system, an exhaust system, and/or a filtration system.

Referring now to FIG. 1, the motor vehicle 18 includes the passenger compartment 14 configured to accommodate one or more passengers. The passenger compartment 14 may be enclosed to separate an internal environment for the one or more passengers from an external environment outside of the motor vehicle 18. In some instances, the one or more passengers may desire or expect an improved air quality inside the passenger compartment 14 as compared to the external environment. The motor vehicle 18 is shown as a car although the type of vehicle 18 is not meant to be limiting and the vehicle 18 could additionally be, for example, a minivan, truck, commercial vehicle, or any other wheeled motorized vehicle.

Figure 2:
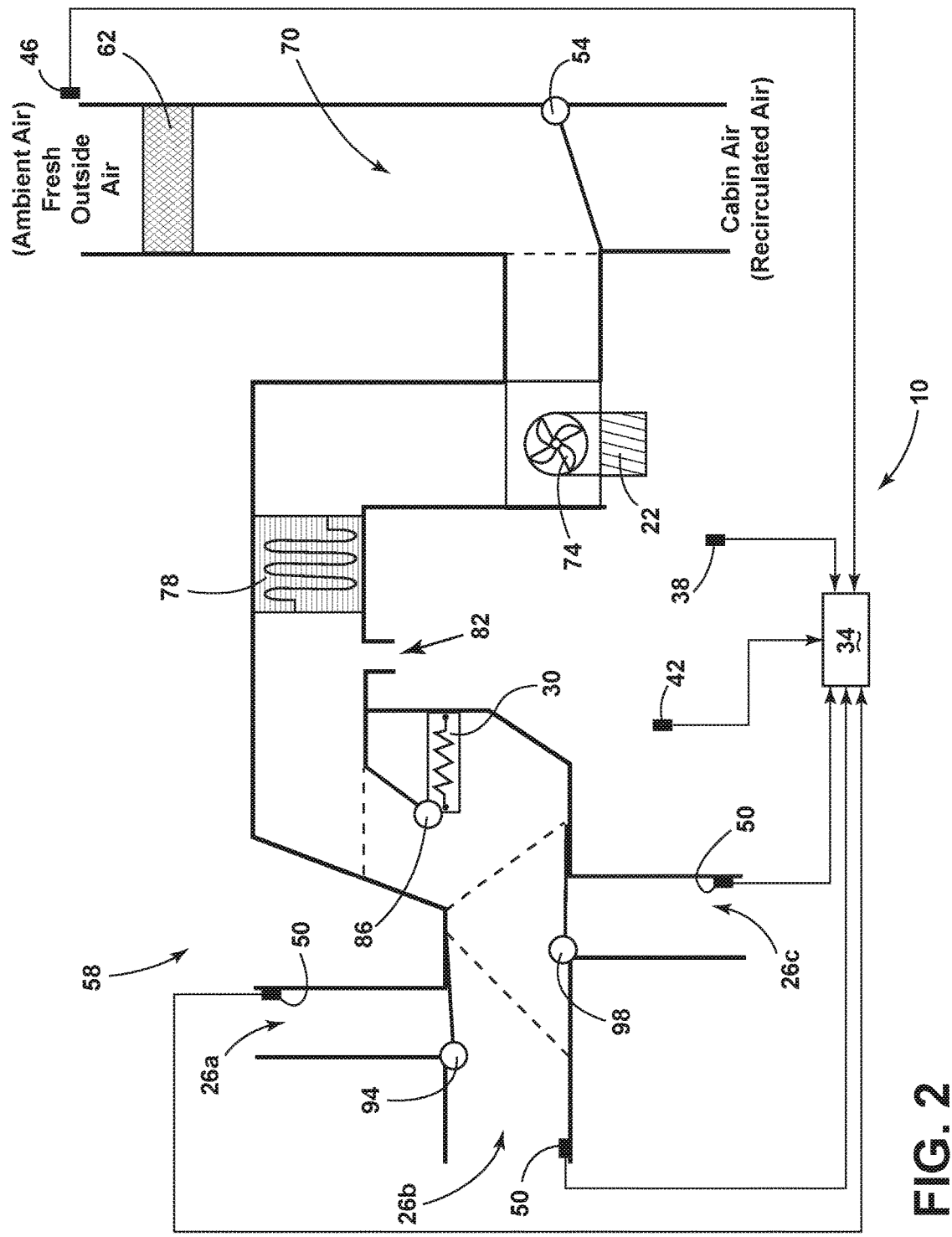
FIG. 2 is a partially schematic cross-sectional view of the HVAC system according to one aspect of the present disclosure.

With reference to FIG. 2, the HVAC system 58 may condition and/or filter fresh outside air (ambient air) and/or cabin air (recirculated air), at least partially, through the use of the heating system 10. The ambient air may be first passed through a cabin air filter 62 where the recirculation door 54 may be positioned to control the input of ambient air and/or recirculated air into a ductwork 70 of the HVAC system 58. The air is circulated through the ductwork 70 of the HVAC system 58 using the blower motor 22 coupled to a fan 74. Once the air has circulated past the recirculation door 54, the air may continue through an evaporator core 78 (cabin air conditioner) that may include an evaporator drain 82. The air may then continue through the ductwork 70 on to a blending flap 86 that directs the air through the heater core 30 (cabin heater) or to the one or more vents 26. The one or more vents 26 may include, for example, defrost vents 26a, main upper vents 26b, and/or floor vents 26c. The conditioned (heated or cooled) and/or filtered air may be directed to the one or more vents 26 through the use of a first mode flap 94 and/or a second mode flap 98. The ductwork 70 and components shown in FIG. 2 for the HVAC system 58 are only meant as exemplary, the connectivity and components may be arranged in any configuration known in the art based on the desired application.

Figure 4:
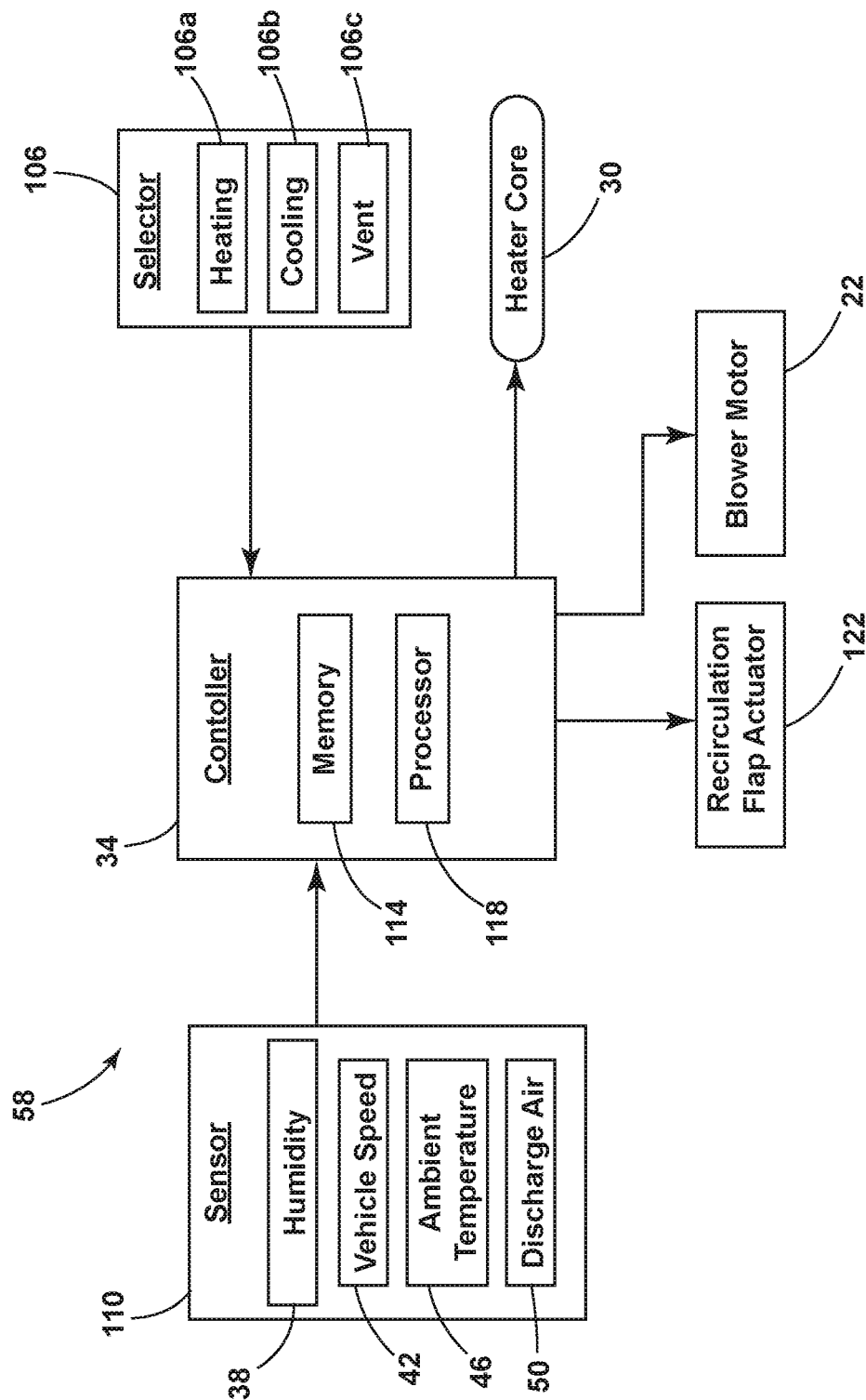
FIG. 4 is a schematic flow diagram of a controller in the HVAC system according to one aspect of the present disclosure.

Still referring to FIG. 2, the HVAC system 58, or more specifically the heating system 10, includes the controller 34 and a plurality of sensors 110 (shown in FIG. 4). The controller 34 is shown electrically coupled to the humidity sensor 38, the vehicle speed sensor 42, the ambient temperature sensor 46, and one or more discharge air sensors 50. In some aspects, as shown in FIG. 2, the data may be directed from the individual sensors 110 to the controller 34 in a unidirectional path. In other aspects, data may be directed back and forth from the individual sensors 110 to the controller 34 in a bidirectional path (not shown). The term, "sensors 110", as used herein, is defined to include one or more humidity sensors 38, one or more vehicle speed sensors 42, one or more ambient temperature sensors 46, and one or more discharge air sensors 50. The number, location, combination, and type of sensors 110 may be varied based on the desired application and/or the environment the motor vehicle 18 may be used in. In some aspects, the HVAC system 58, or more specifically, the heating system 10, includes at least one humidity sensor 38, at least one vehicle speed sensor 42, at least one ambient temperature sensor 46, and a plurality of discharge air sensors 50. Based on the threshold values and data sent from the humidity, vehicle speed, ambient temperature, and discharge air sensors 38, 42, 46, 50 to the controller 34, the position of the recirculation door 54 can move between a 100% fresh air mode and a 100% recirculated air mode to optimize heating.

The humidity sensor 38 is configured to detect the relative humidity inside the passenger compartment 14 to reduce the risk of fogging on a windshield or other glass surface positioned in the passenger compartment. In some aspects, the humidity sensor 38 is an internal humidity sensor. Relative humidity (RH) is the ratio of the partial pressure of water vapor to the equilibrium vapor pressure of water at a given temperature. The relative humidity depends on the temperature and the pressure of the passenger compartment 14 so the ambient temperature sensor 46 may help to determine the relative humidity in some aspects. The threshold value for relative humidity as detected and/or measured by the humidity sensor 38 may be greater than 35%, greater than 40%, greater than 45%, greater than 50%, greater than 55%, or greater than 60%. In some aspects, the threshold value for relative humidity as detected and/or measured by the humidity sensor 38 is greater than 50%. When the relative humidity as detected and/or measured by the humidity sensor 38 is greater than the threshold value and each of the at least one vehicle speed sensor 42, at least one ambient temperature sensor 46, and/or plurality of discharge air sensors 50 are each below their respective threshold values, the recirculation door 54 is triggered or opened for the heating system 10 to use recirculated air to optimize heating. In some aspects, a second humidity sensor (not shown) may be used to provide input/information regarding an ambient relative humidity value that may be used in combination with the plurality of sensors 110 and the controller 34 to control the use of fresh air and/or recirculated air to optimize heating.

The vehicle speed sensor 42 is configured to detect the real-time speed or velocity of the motor vehicle 18. In some aspects, the vehicle speed sensor 42 is a type of tachometer using a toothed ring and pickup that measures the speed of the motor vehicle's 18 wheel rotation. The type or means of detecting the motor vehicle 18 speed is not meant to be limiting and the vehicle speed sensor 42 may be any sensor known in the art to detect the speed of the motor vehicle 18. In some aspects, the threshold value for speed as detected and/or measured by the vehicle speed sensor 42 may be less than 25 miles per hour (mph), less than 30 miles per hour (mph), less than 35 miles per hour (mph), less than 40 miles per hour (mph), less than 45 miles per hour (mph), or less than 50 miles per hour (mph). In some aspects, the threshold value for speed as detected and/or measured by the vehicle speed sensor 42 is less than 40 mph. When the speed as detected and/or measured by the vehicle speed sensor 42 is less than the threshold value, the at least one humidity sensor 38 is above its threshold, and the at least one ambient temperature sensor 46, and plurality of discharge air sensors 50 each are below their respective threshold values, the recirculation door 54 is triggered or opened for the heating system 10 to use recirculated air to optimize heating.

The ambient temperature sensor 46, also referred to as a thermometer or thermocouple, is configured to detect the real-time outside or ambient temperature of the motor vehicle 18. A thermometer has two important elements: (1) a temperature sensor (e.g. the bulb of a mercury-in-glass thermometer) in which some physical change occurs with temperature, and (2) some means of converting this physical change into an electrical signal and/or numerical value (e.g. the visible scale that is marked on a mercury-in-glass thermometer). The type or means of detecting the ambient temperature outside the motor vehicle 18 is not meant to be limiting and the ambient temperature sensor 46 may be any sensor known in the art to detect the temperature of an environment. In some aspects, the threshold value for temperature as detected and/or measured by the ambient temperature sensor 46 may be less than −5° C., less than −4° C., less than −3° C., less than −2° C., less than −1° C., less than 0° C., less than 1° C., less than 2° C., less than 3° C., less than 4° C., or less than 5° C. In some aspects, the threshold value for temperature as detected and/or measured by the ambient temperature sensor 46 is less than −3° C. When the temperature as detected and/or measured by the ambient temperature sensor 46 is less than the threshold value, the at least one humidity sensor 38 is above its threshold, and the at least one vehicle speed sensor 42, and plurality of discharge air sensors 50 each are below their respective threshold values, the recirculation door 54 is triggered or opened for the heating system 10 to use recirculated air to optimize heating.

The discharge air sensors 50, also referred to as a thermometer or thermocouple, are configured to detect a real-time air temperature of the air being circulated out of or through the respective vent 26 and/or ductwork 70 of the motor vehicle 18. As discussed above, many different air vents 26 may be present in the motor vehicle, for example, defrost vents 26a, main upper vents 26b, and/or floor vents 26c. The number, geometry, position, and general aesthetics of the vents 26 may be varied depending on the circulation desired for the passenger compartment 14. In some aspects, each vent 26 in the motor vehicle 18 may have one discharge air sensor 50 coupled to an inner wall of the respective vent 26. In some aspects, the discharge air sensor 50 may be positioned 0.20 meters to 0.75 meters or 0.25 meters to 0.50 meters into the ductwork 70 from the exit of the vent 26. The type or means of detecting the temperature of the air being circulated out of the respective vent 26 is not meant to be limiting and the discharge air sensor 50 may be any sensor known in the art to detect the temperature of a circulating air environment. In some aspects, the threshold value for temperature as detected and/or measured by the discharge air sensor 50 may be less than 55° C., less than 60° C., less than 65° C., less than 70° C., less than 75° C., less than 80° C., or less than 85° C. In some aspects, the threshold value for temperature as detected and/or measured by the discharge air sensor 50 is less than 70° C. When the temperature as detected and/or measured by the discharge air sensor 50 is less than the threshold value, the at least one humidity sensor 38 is above its threshold value, and the at least one vehicle speed sensor 42, and ambient temperature sensor 46 each are below their respective threshold values, the recirculation door 54 is triggered or opened for the heating system 10 to use recirculated air to optimize heating.

The positioning of at least one discharge air sensor 50 in each of the vents 26 in the passenger compartment 14 may work well for a dual zone or multi zone climate controlled motor vehicle 18. In some aspects, the passenger compartment 14 may have a plurality of heating zones. In additional aspects, the passenger compartment 14 may have a plurality of heating zones with each heating zone having one or more discharge air sensors 50 positioned in the heating zone in the respective vent 26. The discharge air sensor 50 may be coupled to the ductwork 70 of the respective vent 26 positioned so a vent insert or control nozzle (not shown) at the end of the vent 26 does not interfere or damage the discharge air sensor 50. The discharge air sensor 50 positioned in or coupled to each vent 26 is individually coupled to the controller 34 so the temperature input/information generated by the discharge air sensor 50 may be used in combination with the at least one humidity sensor 38, the at least one vehicle speed sensor 42, and the at least one ambient temperature sensor 46. In some aspects, the discharge air sensor 50 may be used in combination with the at least one vehicle speed sensor 42 and the at least one ambient temperature sensor 46. In some aspects, the discharge air sensor 50 may be used in combination with the at least one humidity sensor 38 and the at least one ambient temperature sensor 46. In some aspects, the discharge air sensor 50 may be used in combination with the at least one humidity sensor 38 and the at least one vehicle speed sensor 42.

Figure 3:
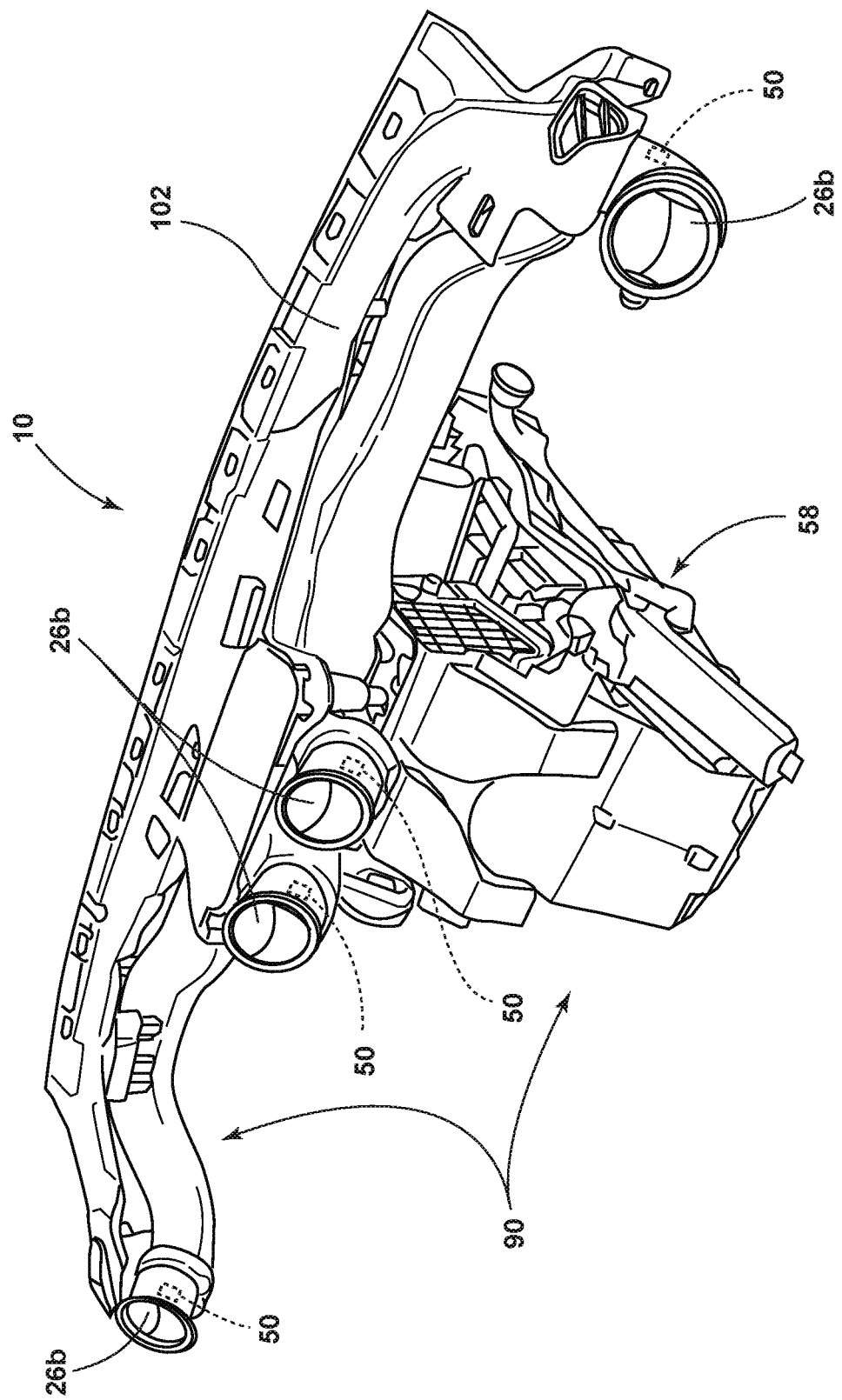
FIG. 3 is a partially schematic isolated view of a dash panel in an HVAC system according to one aspect of the present disclosure.

Referring now to FIG. 3, the HVAC system 58 is shown as a partially schematic view of a HVAC case 90 including a dash panel 102 and a plurality of main upper vents 26b. The number, geometry, position, and general aesthetics for the vents 26 may be varied depending on the circulation desired for the passenger compartment 14 in the motor vehicle 18. The one or more vents 26 are shown extending from the HVAC system 58 positioned towards the passenger compartment 14 to circulate conditioned and/or filtered air. The floor vent 26c circulates air into a foot well for the front seat passengers, rear floor vents circulate air to a floor section in the rear of the motor vehicle 18, and rear side vents circulate air directly into the midsection of the rear seating area. The position and location of the one or more vents 26 may be varied based on the desired circulation and dimensions of the passenger compartment 14 in the respective motor vehicle 18.

With reference to FIG. 4, a schematic flow diagram of the controller 34 in communication with one or more selectors 106 (also referred to as a control head), one or more sensors 110, the blower motor 22, and the heater core 30 is shown for the HVAC system 58. The controller 34 includes a memory 114 which stores instructions executable by a processor 118. The controller 34 additionally receives input/information about the relative humidity, vehicle speed, ambient temperature, and discharge air from the humidity sensor 38, vehicle speed sensor 42, ambient temperature sensor 46, and/or discharge air sensor 50, respectively. The controller 34 may also receive input/information from the selector 106 when a user selects a desired circulation method including a heating method 106a, a cooling method 106b, or a vent method 106c. Upon selecting the desired circulation method to be used, the selector 106 sends the input/information concerning the circulation method to the controller 34 where the processor 118 controls the blower motor 22 and the respective recirculation flap actuator 122 and/or blending flap 86 (FIG. 2). When two, three, or four of the sensors 110 detects a stored threshold value relating to relative humidity, vehicle speed, ambient temperature, and discharge air, the sensors 110 send input/information to the controller 34 where the processor 118 will initiate the heater core 30 and the blower motor 22 to circulate hot air into the passenger compartment 14. Depending on the input from the two, three, or four sensors 110 to the controller 42, the input air into the ductwork 70 (FIG. 2) may be 100% fresh air, 100% recirculated air, or any combination of fresh and recirculated air.

Figure 5:
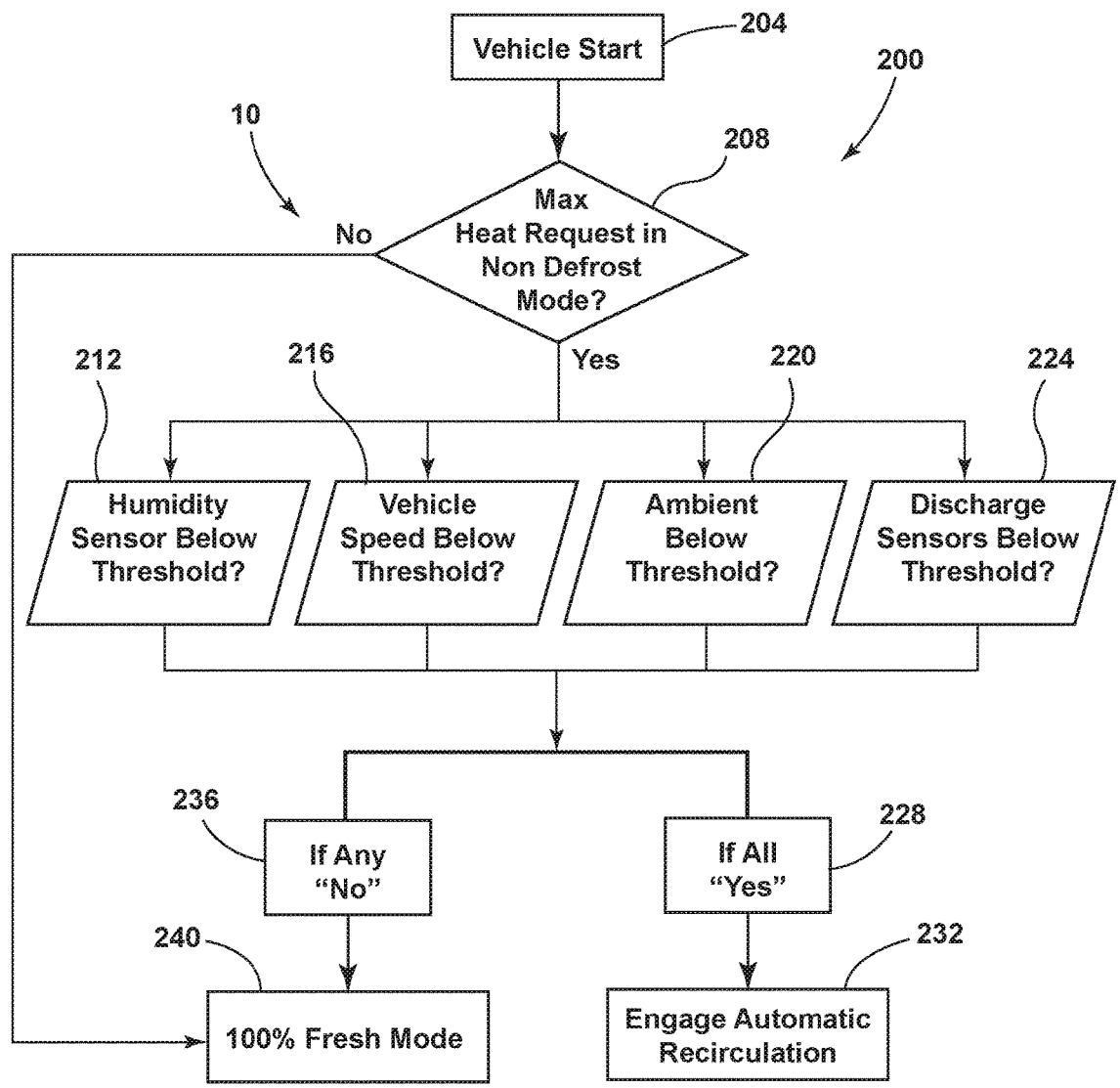
FIG. 5 is a schematic flow diagram illustrating a method for providing maximum heat in the HVAC system according to some aspects of the present disclosure.

Referring now to FIG. 5, one way to expedite the heating of the passenger compartment 14 is to activate the recirculation flap actuator 122 (FIG. 4) located in the heating system 10 and/or HVAC system 58. In these aspects, the motor vehicle 18 is first started or turned on (step 204) and the user requests maximum heat in a non-defrost mode (step 208). Upon request for maximum heat, a combination of data/information will be collected and/or measured from the one or more humidity sensors 38 (step 212), vehicle speed sensors 42 (step 216), ambient temperature sensors 46 (220), and/or discharge air sensors 50 (step 224) and compared to the respective threshold values listed herein for each parameter. The positioning of the recirculation door 54 can determine the composition of incoming air into the passenger compartment 14 between 100% fresh air and 100% recirculated air to optimize heating. The recirculation door 54 will be positioned on either the 100% fresh air option or the 100% recirculated air option based on the readings of the sensors 110. The recirculation door 54 will not open above the humidity sensor threshold while the system is in defrost mode for fogging purposes. When the threshold values are met for each the respective sensors 110 (step 228), the recirculation door 54 will be positioned or opened to engage the 100% recirculated air option to maximize heating of the passenger compartment 14 (step 232). If any one of the criteria or threshold values are not met for the respective sensor 110 (step 236), the heating system 10 will initiate the recirculation door 54 to close or move to the 100% fresh air option until all of the threshold are met for each of the sensors 110 (step 240).

An advantage provided by this claimed heating system 10 includes the introduction of the discharge air sensors 50. Instead of using engine coolant temperatures as a component of a set of criteria used to open the recirculation door 54, the discharge air sensors would be used. Because a standard vehicle can normally only warm up to a certain engine coolant temperature at certain vehicle speeds, the recirculation door 54 in these instances would be greatly limited. However, if the discharge air sensors 50 are set, the air and passenger compartment 14 will continue to warm regardless of the engine coolant temperature. In addition, keeping the recirculation door 54 opened longer will also have a positive impact of fuel economy.

Figure 6:
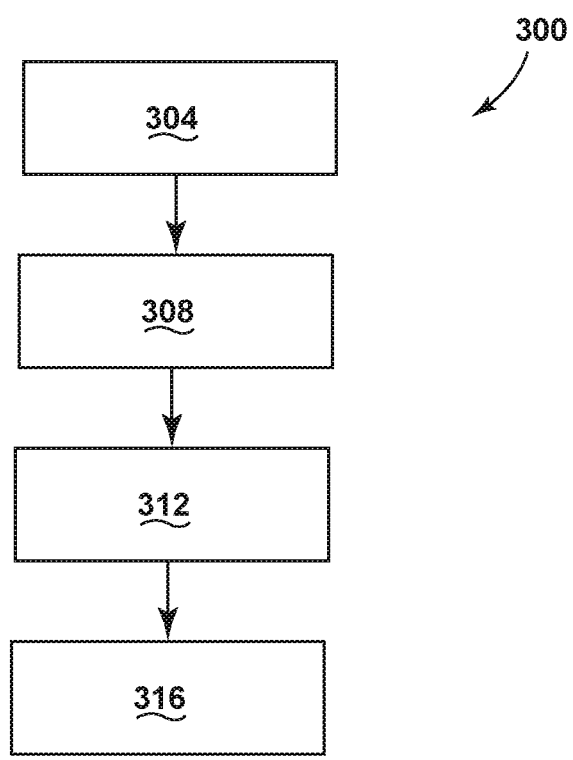
FIG. 6 is a schematic flow diagram illustrating a method of providing heated air to a passenger compartment of a motor vehicle according to some aspects of the present disclosure.

Referring now to FIG. 6, a method 300 of using the heating system 10 for providing heat to the passenger compartment 14 of the motor vehicle 18 provided in FIGS. 1-5 is shown. The method 300 may begin with the step 304 that includes the user selecting the max heat option in non-defrost mode to heat the passenger compartment 14 of the motor vehicle 18.

Next, a step 308 includes providing the circulation of a fresh air flow through the recirculation door 54. In some aspects, the fresh air flow may include 100% fresh air (ambient air) from outside of the motor vehicle 18.

Next, a step 312 of monitoring the humidity value, the vehicle speed value, the external temperature value, and the discharge air temperature value using the humidity sensor 38, the vehicle speed sensor 42, the ambient temperature sensor 46, and the discharge air sensor 50 is provided.

Next, a step 316 of switching the fresh air flow to a recirculated air flow when each of the vehicle speed, internal humidity, external temperature, and discharge air temperature values reach a threshold value is provided.

It is understood that the description outlining and teaching the heating system 10 and/or HVAC system 58 previously discussed, which can be used in any combination, applies equally well to the method 300 for using the heating system 10 to provide heat to the passenger compartment 14 of the motor vehicle 18.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A heating system for a passenger compartment of a motor vehicle, comprising:
    a blower motor;
    one or more vents;
    a heater core; and
    a controller in communication with a humidity sensor, a vehicle speed sensor, an ambient temperature sensor, and a discharge air sensor,
    wherein the controller is configured to open a recirculation door as initiated by the humidity, vehicle speed, ambient temperature, and discharge air sensors all sensing data below a respective threshold level and close the recirculation door when at least one of the humidity, vehicle speed, ambient temperature, and discharge air sensors senses data above the respective threshold level.

2. The heating system of claim 1, wherein the discharge air sensor is coupled to the one or more vents.

3. The heating system of claim 1, wherein the controller is electrically coupled to the humidity sensor, the vehicle speed sensor, the ambient temperature sensor, and the discharge air sensor.

4. The heating system of claim 1, wherein the recirculation door is opened to recirculate an air flow into the passenger compartment.

5. The heating system of claim 1, wherein the recirculation door is closed to circulate a fresh air flow into the passenger compartment.

6. The heating system of claim 1, wherein the humidity sensor is a relative humidity sensor.

7. The heating system of claim 1, wherein the controller is in communication with the heater core and the blower motor.

8. The heating system of claim 1, wherein the discharge air sensor is a real-time sensor.

9. The heating system of claim 1, wherein the passenger compartment has a plurality of heating zones.

10. The heating system of claim 1, wherein the passenger compartment has a plurality of heating zones with each heating zone having one or more discharge air sensors positioned in the heating zone.

11. A method of providing heated air to a passenger compartment of a motor vehicle, the method comprising:
    circulating a fresh air flow through a recirculation door;
    selecting a maximum heat in a non-defrost mode;
    collecting data relating to a vehicle speed value, an internal humidity value, an external temperature value, and a discharge air temperature value using a vehicle speed sensor, a humidity sensor, an ambient temperature sensor, and a discharge air sensor;
    activating an automatic recirculation mode when each of the vehicle speed, internal humidity, external temperature, and discharge air temperature values reach a level below a pre-determined threshold value;
    activating a blending flap such that air is directed to a heater core; and
    activating a recirculation flap actuator to switch from the fresh air flow to a recirculated air flow.

12. The method of claim 11, further comprising:
    detecting when the vehicle speed value is above 40 mph.

13. The method of claim 11, further comprising:
    detecting when the relative humidity value is above 50%.

14. The method of claim 11, further comprising:
    detecting when the external temperature value is below 3° C.

15. The method of claim 11, further comprising:
    detecting when the discharge air temperature value is above 70° C.

* * * * *